Nov. 22, 1927.

A. E. RHOADES 1,649,977

REVERSING GEAR MECHANISM

Filed June 1, 1926

Inventor.
Alonzo E. Rhoades, deceased
by Annie Maria Buswell and
M. Margaret Buswell, Executrices
by Heard Smith & Tennant.
Attys.

Nov. 22, 1927.  
A. E. RHOADES  
1,649,977  
REVERSING GEAR MECHANISM  
Filed June 1, 1926  
3 Sheets-Sheet 2

Inventor.  
Alonzo E. Rhoades, deceased  
by Annie Maria Buswell and  
M. Margaret Buswell, Executrices  
by Heard Smith & Tennant  
Attys.

Nov. 22, 1927.
A. E. RHOADES
1,649,977
REVERSING GEAR MECHANISM
Filed June 1, 1926    3 Sheets-Sheet 3
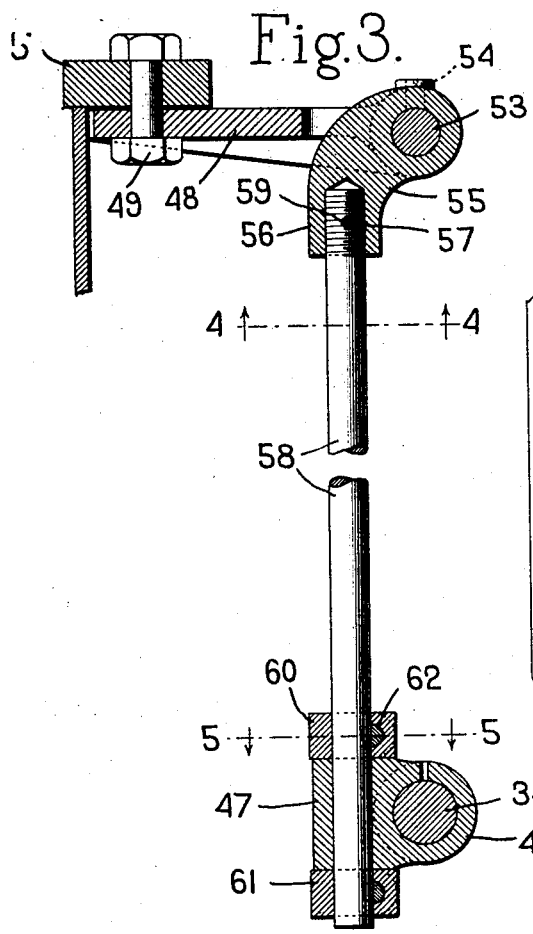
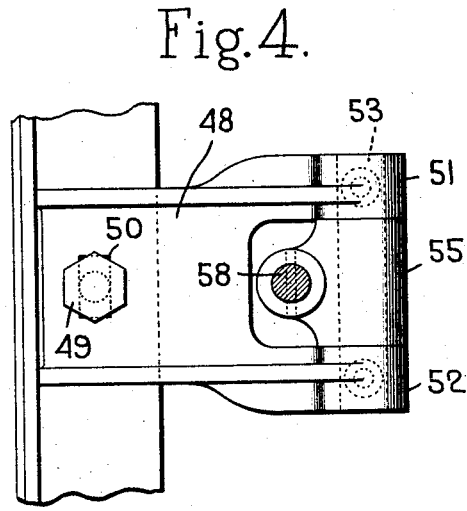
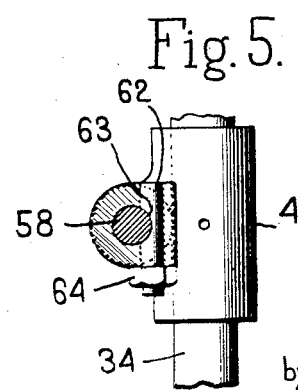
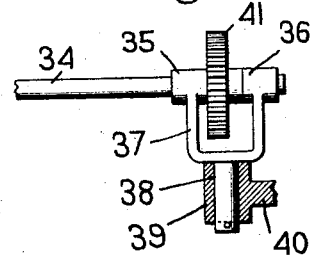
Inventor.
Alonzo E. Rhoades, deceased
by Annie Maria Buswell and
M. Margaret Buswell, Executrices
by Heard Smith & Tennant.
Attys.

Patented Nov. 22, 1927.

1,649,977

UNITED STATES PATENT OFFICE.

ALONZO E. RHOADES, DECEASED, LATE OF DOVER-FOXCROFT, MAINE, BY ANNIE MARIA BUSWELL AND MARY MARGARET BUSWELL, EXECUTRICES, OF DOVER-FOXCROFT, MAINE, ASSIGNORS TO DRAPER CORPORATION, OF HOPEDALE, MASSACHUSETTS, A CORPORATION OF MAINE.

REVERSING-GEAR MECHANISM.

Application filed June 1, 1926. Serial No. 112,791.

This invention relates to improvements in reversing gear mechanism of the mangle gear type, and the principal object thereof is to provide a novel means for supporting the pinion shaft to permit the lateral movement thereof which is necessary to enable the pinion to engage opposite faces of the mangle gear.

In usual mangle gear construction the free end of the pinion shaft is supported in a slot in a suitable bracket to permit the necessary lateral movement thereof. The reversing movement of the pinion as it passes from one side of the mangle gear to the other wears the walls of the slot so that lost motion is produced which in time interferes with the proper operation of the reversing mechanism.

The object of the present invention is to provide means for so supporting the free end of the pinion shaft, that this defect of operation will be avoided.

In usual mangle gear construction the walls of the slot which support the pinion shaft are usually relatively thin, and a further object of the invention is to provide a relatively long bearing for supporting the free end of the pinion shaft, which will obviate the usual wear of the pinion shaft.

The present invention contemplates the provision of a preferably long bearing for the pinion shaft located in proximity to the pinion and supported upon a pivot which is located at a sufficient distance from the axis of the actuating shaft to permit the bearing to move laterally in the general direction of a radius of the mangle gear and desirably in an arc approximately a straight line.

A further object of the invention is to provide means for pivotally supporting the bearing in such a manner that it may swing about an axis perpendicular to the axis of the pinion shaft so that the lateral movement of the free end of the pinion shaft will not cause a binding of the bearing upon the pinion shaft.

Other objects and features of the invention will more fully appear from the following description and the accompanying drawings and will be particularly pointed out in the claims.

The invention as disclosed herein is applied to the traverse producing mechanism of a spooler, but it will be understood that the invention may be utilized in other machines or any other devices to which it is applicable.

A preferred embodiment of the invention is illustrated in the accompanying drawings in which:

In the drawings:

Fig. 3 is a detail view mainly in vertical section, showing the means for pivotally supporting the free end of the pinion shaft.

Fig. 4 is a detail underneath plan view of the construction shown in Fig. 3.

Fig. 5 is a view partially in section showing a preferred means for connecting the bearing block to the suspension rod; and, Fig. 6 is a detail view showing the pivotal mounting for the opposite or driving end of the pinion shaft.

Figure 1:
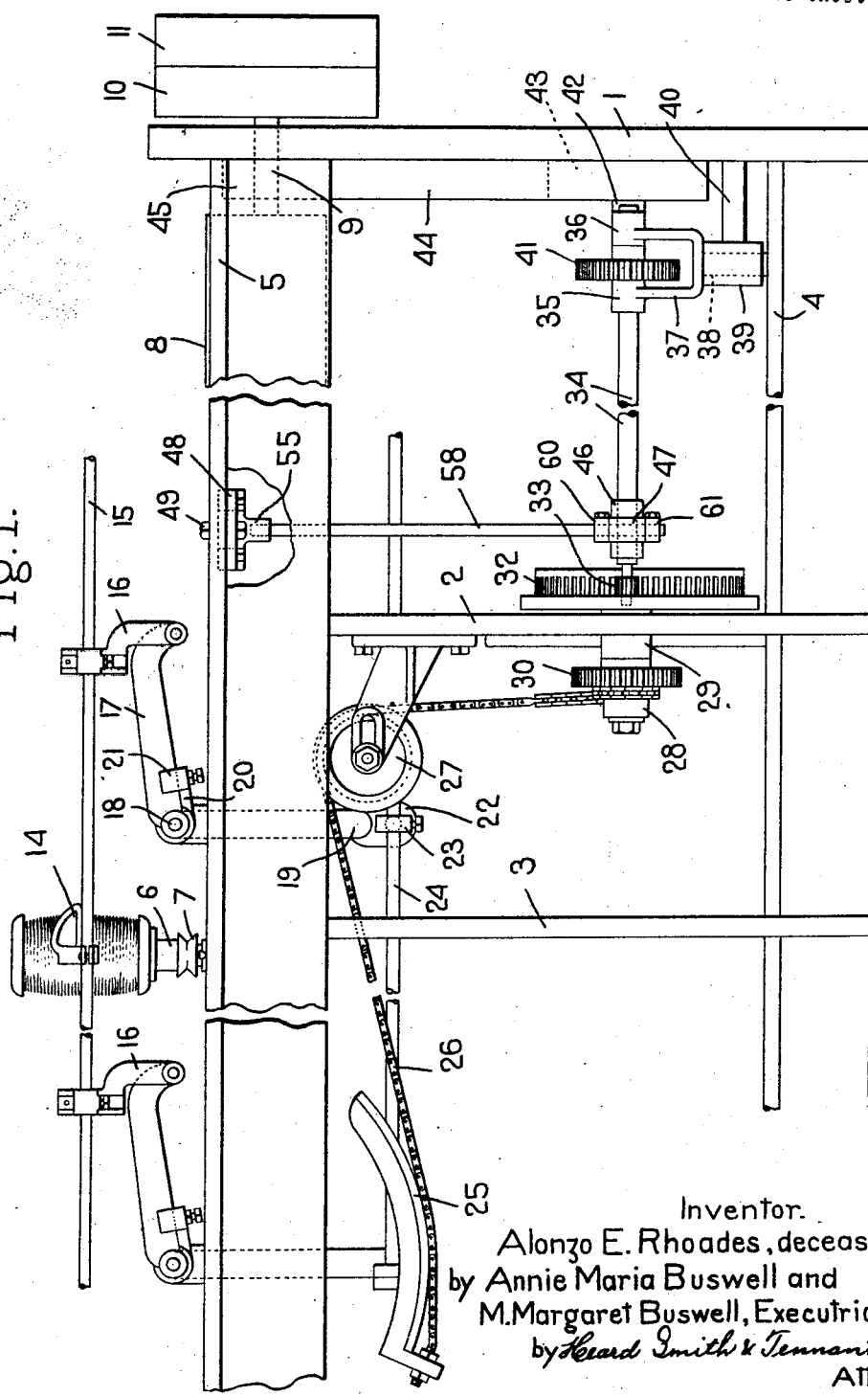
Fig. 1 is a partial side elevation, broken out to economize space, of a spooler embodying a preferred form of the invention.
Figure 2:
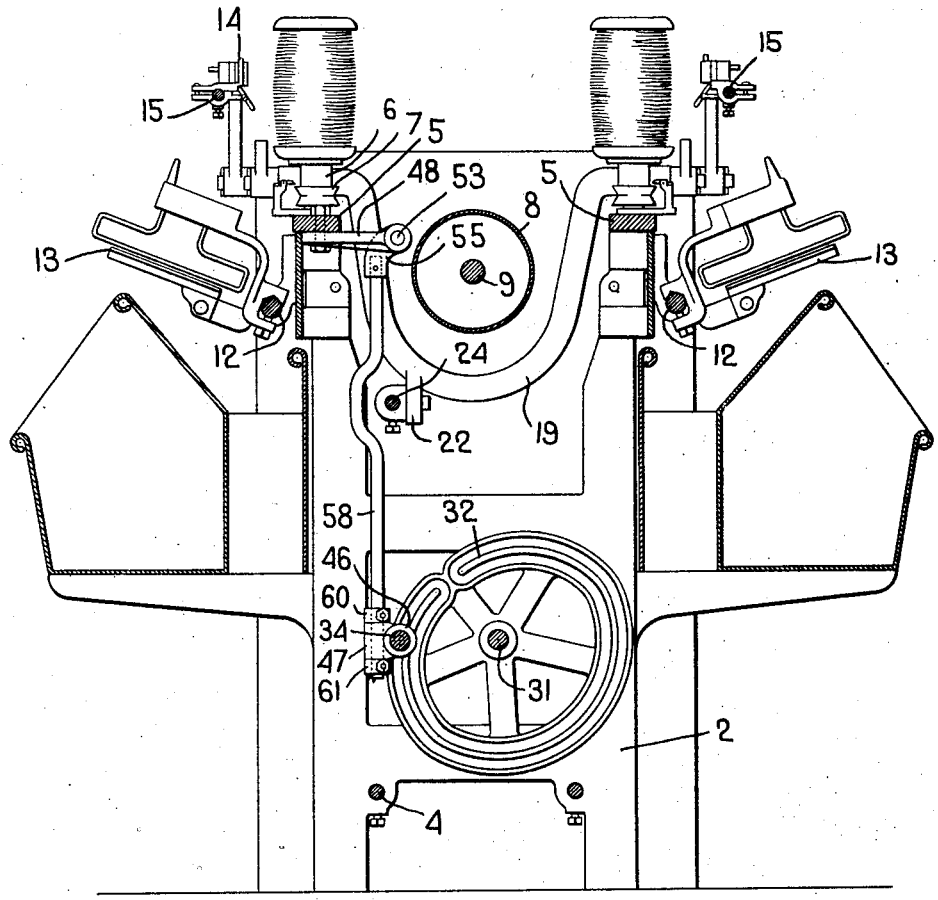
Fig. 2 is an end vertical sectional view showing mainly in elevation the mangle gear and the mechanism of the spooler.

The spooler illustrated in the accompanying drawings is of a usual type and comprises main supporting frames 1, 2, 3, which are connected near their lower ends by rods 4 and supporting at their upper ends rails 5 upon which suitable spool holders 6 are mounted. The spindles of the spool holders 6 are provided with whorls 7, which are driven by suitable belts which pass around the usual drum 8 which is mounted upon a shaft 9 extending longitudinally of the frame and is provided with the usual fast and loose driving pulleys 10 and 11.

As is usual in spooling machines, the spindles are arranged symmetrically upon opposite sides of the drum 8 and the traverse mechanism which lays the thread upon the spools is actuated simultaneously for both sets of spool holders.

The rods 12 which extend longitudinally of the frame and are suitably secured thereto support bobbin holders 13 which receive the bobbins. The thread is led from the bobbins upwardly through thread guides 14 which are clamped upon vertically reciprocating traverse rods 15. The vertical reciprocating movement of the traverse rod causes the traverse of the thread upon the spool. The traverse rods are supported upon a series of vertical arms 16 which are pivotally connected at their lower ends to the free ends of rocker arms 17 which are pivotally mounted upon extensions 18 of U-shaped yokes 19 which are carried in suitable bearings mounted upon the side rails 5. The extensions 18 of the yokes are provided with short arms 20 having laterally and vertically offset portions 21 which engage the end face of the rocker arms 17. The yokes are provided with downwardly and laterally extending lugs 22 which are fixedly secured upon a rod 24 which extends longitudinally of the machine. One of the yokes 19 is provided with a curved shoe 25 to which is connected one end of a chain 26 which passes over an idle pulley 27 and is connected at its opposite end to a winding drum 28 which is rotated alternately in opposite directions by a mangle gear mechanism. The winding up and unwinding of the chain upon the drum acts through the rocker 25 to oscillate one of the yokes and by reason of the fact that all of the yokes are connected together by the rod 24, they are all oscillated in unison. The oscillation of these yokes acting through the short arms 20 raises and lowers the rocker arms 17 and thereby raises and lowers the traverse rod 15 to cause a traverse of the thread upon the spools. The mechanism thus described is of a usual type.

The winding drum 28 is mounted upon a stub shaft carried by a bracket 29 secured to the frame 2, and is provided with a gear 30 which engages a complementary gear (not shown) of suitable diameter which is fixedly secured to a shaft 31 which is also mounted in the bracket 29 and has secured to it a mangle gear 32. The mangle gear 32 is driven by a pinion 33 which is fixedly secured upon the free end portion of a shaft 34 which is mounted in bearings 35 and 36 of a yoke 37 having a downwardly extending cylindrical stem 38 which is rotatably mounted in a boss 39 upon a bracket 40 which is secured to the end frame 1. A gear 41 which is fixedly secured to the shaft 34 is driven by a complementary gear (not shown) upon a counter-shaft 42 which is provided with a pulley 43 which is driven by a belt 44 from a pulley 45 upon the main shaft 9 of the spooler.

In usual construction the free end of the pinion shaft 34 is supported in a slot in a bracket which is secured to the frame 2 and, as heretofore described, the movement of the pinion as it passes from one side of the mangle gear to the other causes the walls of the slot of the supporting bracket and also the pinion shaft to wear rapidly, because of the considerable resistance produced by the sudden arrest and reversal of the traverse mechanism.

The present invention contemplates the provision of novel mechanism for supporting the free end of the pinion shaft, which will avoid such wear and will insure a more perfect operation of the mangle gear mechanism.

In the preferred construction illustrated in the accompanying drawings the free end portion of the pinion shaft is mounted in a preferably relatively long bearing 46 in a bearing block 47 which is supported upon a pivot located at a sufficiently remote distance from the axis of the pinion shaft 34 to permit the pinion 33 to move laterally in the general direction of a radius of the mangle gear, that is to say, in an arc which approximates a straight line. Any suitable means for thus supporting the bearing may be employed. In the preferred construction illustrated herein the bearing block is fixedly secured to the lower end portion of a suspension rod the upper end of which is pivotally mounted upon a flange of the side rail 5. As illustrated, a bracket 48 is adjustably secured to the under face of the side rail 5 by a bolt and slot connection 49, 50. The bracket 48 desirably is of yoke shape and the arms 51 and 52 thereof are provided with cylindrical bosses in which a shaft 53 is mounted and secured by set screws 54. A bracket 55 which is pivotally mounted upon the shaft 53 is provided with the downwardly extending arm 56 having a screw threaded socket 57 which receives the upper screw threaded end of a suspension rod 58. Desirably, the end of the suspension rod is fixedly secured in said socket by a pin 59 which extends through the arm 56 and rod 58. The bearing block 47 is rotatably mounted upon the lower end portion of the suspension rod 58 and means are provided for adjustably securing the same upon the rod to permit such adjustment as may be required in the assembling of the mechanism. Any suitable means may be provided for thus securing the bearing block to the suspension rod. The pivotal shaft 53 which supports the suspension rod 58 desirably is located in a plane substantially tangential to the median position of the periphery of the mangle gear, so that the amplitude of the lateral movements of the pinion 33 will be substantially symmetrical with respect to such plane during the rotation of the mangle gear.

In the preferred construction illustrated, collars 60 and 61 mounted upon the suspension rod 58 engage opposite faces of the bearing block 47 and suitable means are provided for releasably clamping the collars upon the suspension rod. As illustrated herein, the collars are provided with cylindrical apertures bored transversely therethrough at right angles to the apertures through which the suspension rod passes, and the transverse apertures intersect the suspension rod receiving apertures. Bolts 62 are mounted in the transverse apertures and are provided with recesses 63 which partially embrace the suspension rod 58. By setting up the nuts 64 of the bolts 62, the collars will be clamped firmly upon the suspension rod. By releasing the nuts 64 and driving back the bolts 62 slightly, the clamping tension will be relieved, so that the collars may be adjusted longitudinally of the suspension rod thereby enabling the bearing block to be raised and lowered as may be necessary to place the pinion 33 in proper relation to the mangle gear.

In the operation of the machine the pinion shaft 34 is driven from the main driving shaft through the gear, above described. The pivotal mounting of the supporting bracket 37 of the pinion shaft permits lateral movement of the free end of the pinion shaft which carries the pinion 33. As the pinion shaft is supported in proximity to the pinion 33 by the bearing 46, which is relatively long, and as the bearing 46 is in turn suspended from a pivot which is located at such distance from the axis of the pinion shaft as to permit the bearing 46 and the pinion 33 to swing in substantially a straight line in the direction of a radius of the mangle gear, the pinion shaft is subjected to little if any wear.

Accuracy of operation of the mangle gear mechanism is insured and the life thereof is greatly prolonged. It will be understood that the particular embodiment of the invention disclosed herein is of an illustrative character, and is not restrictive, and that various changes in form, construction and arrangement of parts made within the spirit and scope of the following claims. It will be also understood that the invention may be applied to various other uses than that which is particularly set forth herein.

Having thus described the invention, what is claimed as new, and desired to be secured by Letters Patent, is:

1. Reversing gear mechanism comprising a mangle gear, an actuating shaft having a long bearing remote from said mangle gear pivotally mounted to swing about an axis perpendicular to the axis of said shaft and having a pinion mounted upon the laterally movable free end of said actuating shaft co-operating with said mangle gear, a long bearing for said actuating shaft located in proximity to said pinion and means for pivotally supporting said proximate bearing to swing about a center sufficiently remote from the axis of said shaft to permit said proximate bearing to move laterally in the general direction of a radius of said mangle gear.

2. Reversing gear mechanism comprising a mangle gear, an actuating shaft having a co-operating pinion mounted upon the laterally movable free end thereof, a bearing for said shaft located in proximity to said pinion and means for pivotally supporting said bearing to swing about a center sufficiently remote from the axis of said shaft to permit said bearing to move laterally in the general direction of a radius of said mangle gear and means for adjusting the effective length of said bearing supporting means.

3. Reversing gear mechanism comprising a mangle gear, an actuating shaft having a co-operating pinion mounted upon the laterally movable free end thereof, a bearing block having a bearing engaging said shaft in proximity to said pinion, a suspension rod rotatably connected to said bearing block and means pivotally supporting the other end of said suspension rod at a sufficient distance from axis of said actuating shaft to permit said bearing to move laterally in the general direction of a radius of said mangle gear.

4. Reversing gear mechanism comprising a mangle gear, an actuating shaft having a co-operating pinion mounted upon the laterally movable free end thereof, a bearing block having a long bearing engaging said shaft in proximity to said pinion, a suspension rod connected to said bearing block and a pivotal support for the end of said rod located in a vertical plane substantially tangential to the median position of the periphery of said mangle gear, and at a sufficient distance from the axis of said actuating shaft to permit said bearing to move laterally in the general direction of a radius of said mangle gear and means for adjusting the pivotal support for said rod.

5. Reversing gear mechanism comprising a mangle gear, an actuating shaft having a co-operating pinion mounted upon the laterally movable free end thereof, a bearing block having a long bearing engaging said shaft in proximity to said pinion, and provided with a socket, a suspension rod adjustably secured in said socket and means pivotally supporting the upper end of said rod at a sufficient distance from the axis of said actuating shaft to permit said bearing to move laterally in the general direction of a radius of said mangle gear.

6. Reversing gear mechanism comprising a mangle gear, an actuating shaft having a co-operating pinion mounted upon the laterally movable free end thereof, a bearing block having a long bearing engaging said shaft in proximity to said pinion, and provided with an aperture extending therethrough perpendicular to the plane of the axis of said shaft, and a suspension rod extending through said aperture, means for retaining said bearing block against longitudinal movement on said rod, but permitting relative rotation therebetween and means pivotally supporting the upper end of said rod at a sufficient distance from the axis of said actuating shaft to permit said bearing to move in the general direction of a radius of said mangle gear.

7. Reversing gear mechanism comprising a mangle gear, an actuating shaft having a co-operating pinion mounted upon the laterally movable free end thereof, a bearing block having a long bearing engaging said shaft in proximity to said pinion, and provided with an aperture extending therethrough perpendicular to the plane of the axis of said shaft, and a suspension rod extending through said aperture, collars upon said suspension rod engaging the upper and lower faces of said bearing block, bolts mounted in said collars having recesses to engage said suspension rod and operable when set up by their nuts to clamp said collars firmly upon said rod, and means pivotally supporting the upper end of said rod at a sufficient distance from the axis of said actuating shaft to permit said bearing to move laterally in the general direction of a radius of said mangle gear.

In testimony whereof, we have signed our names to this specification.

ANNIE M. BUSWELL.
M. MARGARET BUSWELL.
*Executrices of the Last Will and Testament of Alonzo E. Rhoades, Deceased.*